July 6, 1937.   A. ZIELESCH   2,086,457
SELF ADJUSTING SINKER
Filed April 6, 1936
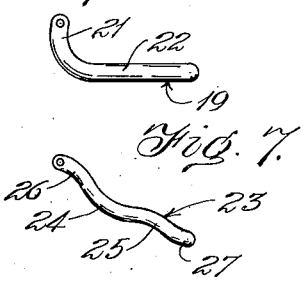
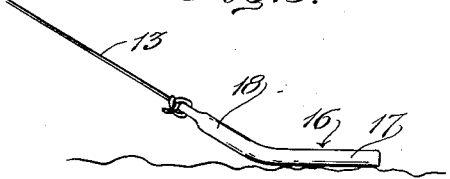
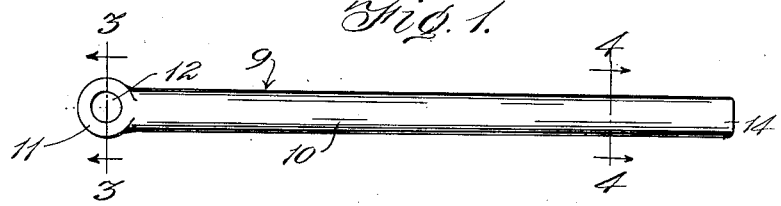
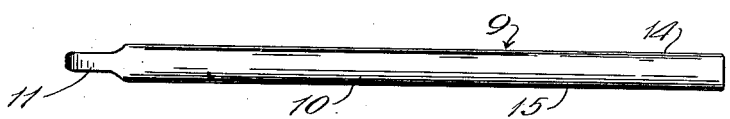
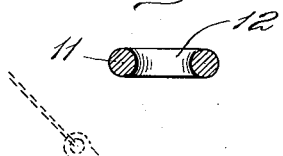
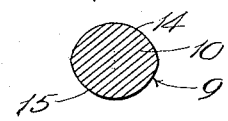
Inventor
ALVIN ZIELESCH
By Kimmel & Crowell,
Attorneys Patented July 6, 1937

2,086,457

UNITED STATES PATENT OFFICE 2,086,457

SELF-ADJUSTING SINKER

Alvin Zielesch, Portland, Oreg.

Application April 6, 1936, Serial No. 73,029

5 Claims. (Cl. 43—52)

This invention relates to a self-adjusting sinker for fishing lines.

One of the objects of the invention is to provide, in a manner as hereinafter set forth, a sinker including a body of the desired weight possessing readily flexible adjustability.

A further object of the invention is to provide, in a manner as hereinafter set forth, a sinker possessing readily flexible adjustability providing, if it becomes fastened in or on rocks or snags, for being readily extracted on a pull of the line due to its flexible adjustability.

A further object of the invention is to provide, in a manner as hereinafter set forth, a sinker which may be of any weight desired by increasing its thickness or its length.

A further object of the invention is to provide, in a manner as hereinafter set forth, a sinker of a shape and length which prevents rolling and further with a small curvature which, in turn, prevents unwinding of the fishing line.

A further object of the invention is to provide, in a manner as hereinafter set forth, a sinker so shaped and of a length to prevent its automatically encompassing a snag.

A further object of the invention is to provide, in a manner as hereinafter set forth, a sinker whereby its uniformity will prevent wedging between rocks and angular snags.

A further object of the invention is to provide, in a manner as hereinafter set forth, a sinker so shaped as to prevent angling.

A further object of the invention is to provide, in a manner as hereinafter set forth, a sinker constructed of a material which is easily adjustable and may be formed into the fashion of a runner to slide over rocks, or if caught between rocks or snags will easily bend and adjust itself to the irregular surface with which it comes in contact or might be attached to, and will not easily anchor because of its form and pliability.

As it is well known, along the entire coast, especially in the Northwestern part of the United States, all streams which flow into the Pacific Ocean are visited semi-annually by anadromous fish, especially salmon. Anadromous fish live close to the bottom of the water and are most successfully caught with a spoon which is trolled. In order to get the spoon close to the bottom, one must have a proper sinker, generally from four to ten ounces, depending on the current of the stream. The sinker must drag on the bottom of the stream. The bottom of the stream is generally full of rocks and snags, and very frequently the sinker is caught either in rocks or snags, and as a result a fisherman generally loses his entire hook, line and sinker. To overcome the loss referred to is one of the objects of this invention and which is attained by the providing of a sinker of the desired weight and uniform thickness possessing inherent, readily flexible adjustability.

A further object of the invention is to provide, in a manner as hereinafter set forth, a readily flexible sinker possessing an inherent adjustability to prevent its loss when impacting irregular surfaces, passing between irregular surfaces or abutting snags.

A further object of the invention is to provide, in a manner as hereinafter set forth, a sinker formed of a body of uniform thickness possessing a characteristic whereby the sinker may be used in the straight, sled, angle worm and rudder type as desired.

A further object of the invention is to provide, in a manner as hereinafter set forth, a sinker of the desired weight and length and formed of a material possessing flexible adjustability to reduce the anchoring thereof to a minimum when fishing.

A further object of the invention is to provide, in a manner as hereinafter set forth, a sinker formed of self-adjusting material capable of quickly removing the sinker from an obstruction by a pull on the line.

To the above ends essentially and to others which may hereinafter appear, the invention consists of a construction of sinker which falls within the scope of the invention as claimed.

In the drawing:

Figure 1 is a top plan view of the sinker,

Figure 2 is a side elevation thereof,

Figures 3 and 4 are sections on lines 3—3, 4—4, respectively, Figure 1,

Figure 5 is a side elevation of the self-adjusting sinker in the form of what may be termed the "sled" type or one shape a straight sinker would assume when force is applied thereto by the line when the sinker meets with an obstruction, Figure 6 is a side elevation of the self-adjusting sinker in the form of what may be termed the "rudder" type or another shape a straight sinker would assume when force is applied thereto by the line when the sinker meets with an obstruction, Figure 7 is a side elevation of the self-adjusting sinker in the form of what may be termed the "angle worm" type or still another shape a straight sinker would assume when force is applied thereto by the line when the sinker meets with an obstruction, and Figure 8 is a diagrammatic view illustrating in full lines the sinker in normal position when caught between rocks and in dotted lines in self-adjusted position after passage between the rocks.

The sinker, generally indicated at 9, includes a body portion 10 having an extension 11 of reduced thickness at one end and with the extension 11 formed with an opening 12 to fasten a line 13 with body 10. It is obvious that in lieu of connecting a line 13 to the reduced extension 11 it may be connected to a swivel, not shown, and the swivel attached to the extension 11 by passing the swivel through the opening 12. The body 10 is of uniform thickness throughout and preferably slightly ovoidal in transverse cross section, as shown in Figure 4, whereby body 10 will be formed with oppositely curved surfaces 14, 15.

The body 10 and extension 11 are formed of a material throughout possessing a readily pliable characteristic to provide for the self-adjusting of the sinker when occasion requires.

The body 10 and extension 11 may consist of lead with other suitable alloys, to give it a readily flexible or pliable characteristic.

The sinker can be of any suitable weight desired and with its body 10 of uniform thickness throughout and of any length desired. Preferably the length of the extension 11 will be as shown.

With reference to Figure 5, the sinker, generally indicated at 16, is formed of a straight stretch 17 and a stretch 18 disposed at an obtuse angle to the inner end of stretch 16.

With reference to Figure 6, the sinker is generally indicated at 19 and is formed of a pair of stretches 21, 22. The stretch 21 is disposed at right angles to one end of the stretch 22 and the latter is of greater length than the stretch 21.

Referring to Figure 7, the sinker is generally indicated at 23 and is of ogee curvature and is formed of a pair of oppositely disposed concavo-convex stretches 24, 25. The stretch 24 terminates at its forward end in an upstanding slightly curved extension 26. The stretch 25 terminates at its rear end in a slightly curved rearwardly disposed concavo-convex extension 27.

With reference to Figure 8, rocks are indicated at 28, 29 against which abuts a sinker designated 30. The dotted lines 31, Figure 8, indicate the position of sinker 30 after it has adjusted itself to pass between the rocks 28, 29 due to a pull on line 13.

The sinker may be readily shaped to suit the fisherman's desire, preferably most fishermen desire a shape of the rudder type. The material of the sinker is such that if the sinker becomes fastened in or on rocks or snags, it will automatically adjust itself, and further may be readily extracted on a pull of the line due to the flexible adjustability of such material.

What I claim is:

1. In a sinker for fishing lines, a weighting body for the line, said body having an apertured inherent part at one end providing means for coupling it to the line, said body being of the desired length and being solid from said means to its other end, said body and means being formed of a material possessing a readily pliant characteristic to provide for conveniently shaping said body and to provide for the self-adjusting of the sinker when meeting with an obstruction during fishing.

2. In a sinker for fishing lines, a weighting body for the line, said body having an apertured inherent part at one end providing means for coupling it to the line, said body being of the desired length and being solid from said means to its other end, said body and means being formed of a material possessing a readily flexible characteristic to provide for conveniently shaping said body and to provide for the self-adjusting of the sinker when meeting with an obstruction during fishing, said body, in transverse cross section, being of ovoidal contour.

3. In a sinker for fishing lines, a one-piece weighting means, said means being formed of a straight solid body of uniform thickness throughout and a reduced apertured extension at one end of said body providing means for coupling it to the fishing line, said body being of materially greater length than said extension and possessing a readily flexible characteristic for shaping it and to provide for the self-adjusting of the sinker when meeting with an obstruction during fishing.

4. The invention as set forth in claim 3 wherein said body is of ovoidal contour in cross section and said extension in the form of an annulus.

5. In a sinker for fishing lines, a one-piece weighting means formed of a straight body having an opening in proximity to one of its ends, that portion of said body bordering the opening being solid and the remaining portion of said body being solid, said body possessing a readily pliant characteristic throughout to provide for conveniently shaping it and to provide for the self-adjusting of the sinker when meeting with an obstruction during its use in fishing.

ALVIN ZIELESCH.